(12) United States Patent
Büttner et al.

(10) Patent No.: US 9,935,519 B2
(45) Date of Patent: Apr. 3, 2018

(54) COOLING JACKET (71) Applicant: SIEMENS AKTIENGESELLSCHAFT, München (DE)

(72) Inventors: Klaus Büttner, Hollstadt (DE); Klaus Kirchner, Ostheim (DE); Matthias Warmuth, Windshausen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 510 days.

(21) Appl. No.: 14/416,912

(22) PCT Filed: Jun. 20, 2013

(86) PCT No.: PCT/EP2013/062881
§ 371 (c)(1),
(2) Date: Jan. 23, 2015

(87) PCT Pub. No.: WO2014/016064
PCT Pub. Date: Jan. 30, 2014

(65) Prior Publication Data
US 2015/0214810 A1   Jul. 30, 2015

(30) Foreign Application Priority Data
Jul. 25, 2012   (DE) .................. 10 2012 213 059

(51) Int. Cl.
*H02K 9/00* (2006.01)
*H02K 5/20* (2006.01)
(Continued)

(52) U.S. Cl.
CPC ............ *H02K 5/20* (2013.01); *B23P 15/26* (2013.01); *H02K 9/19* (2013.01); *H02K 9/197* (2013.01);
(Continued)

(58) Field of Classification Search
CPC ............ H02K 5/20; H02K 15/14; H02K 9/12; H02K 9/19
(Continued)

(56) References Cited

U.S. PATENT DOCUMENTS 5,616,973 A * 4/1997 Khazanov ............... H02K 5/20
                                                                310/54
6,169,344 B1   1/2001 Tsuruhara
(Continued)

FOREIGN PATENT DOCUMENTS

CN   201230255 Y   4/2009
DE   7 242 113 U   7/1974
(Continued)

OTHER PUBLICATIONS

Wikipedia, der freien Enzyklopädie "Strangpressen";pp. 1-2, Oct. 24, 2016 https://de.wikipedia.org/wiki/Strangpressen; and a Translation thereof.

*Primary Examiner* — Hanh Nguyen
(74) *Attorney, Agent, or Firm* — Henry M. Feiereisen LLC (57) ABSTRACT

A cooling jacket for cooling using a fluid includes an inner part, an outer jacket that extends in an axial direction and surrounds the inner part in a cross-sectional plane perpendicular to the axial direction, and a duct for holding the fluid. A first boundary of the duct an outer surface of the inner part, while a second boundary of the duct includes an inner surface of the outer jacket. The inner part is arranged inside the outer jacket, and a material property of the outer jacket is different from the material property of the inner part.

17 Claims, 4 Drawing Sheets (51) Int. Cl.
  *H02K 9/19* (2006.01)
  *B23P 15/26* (2006.01)
  *H02K 9/197* (2006.01)
  *H02K 15/14* (2006.01)
(52) U.S. Cl.
  CPC .......... *H02K 15/14* (2013.01); *B60L 2220/50* (2013.01); *B60L 2240/425* (2013.01); *Y02T 10/641* (2013.01); *Y02T 10/642* (2013.01); *Y10T 29/49009* (2015.01); *Y10T 29/4935* (2015.01)
(58) Field of Classification Search
  USPC .......................... 310/52, 54, 58, 64; 29/596
  See application file for complete search history.

(56) References Cited

U.S. PATENT DOCUMENTS

| | | | | |
|---|---|---|---|---|
| 6,300,693 | B1 * | 10/2001 | Poag | H02K 5/20 |
| | | | | 310/54 |
| 6,617,715 | B1 * | 9/2003 | Harris | H02K 5/20 |
| | | | | 123/41.31 |
| 7,663,272 | B2 * | 2/2010 | Oyoung | H02K 5/20 |
| | | | | 310/54 |
| 7,737,585 | B2 | 6/2010 | Bähr et al. | |
| 8,836,193 | B2 | 9/2014 | Büttner et al. | |
| 2007/0096588 | A1 | 5/2007 | Kirchner | |
| 2008/0284263 | A1 | 11/2008 | Dessirier | |
| 2012/0133236 | A1 | 5/2012 | Büttner et al. | |
| 2012/0169158 | A1 | 7/2012 | Büttner et al. | |
| 2012/0187796 | A1 | 7/2012 | Büttner et al. | |
| 2012/0205996 | A1 | 8/2012 | Büttner et al. | |
| 2013/0175892 | A1 | 7/2013 | Büttner et al. | |
| 2013/0187512 | A1 | 7/2013 | Büttner et al. | |
| 2013/0234543 | A1 | 9/2013 | Büttner et al. | |
| 2013/0257197 | A1 | 10/2013 | Büttner et al. | |

FOREIGN PATENT DOCUMENTS

| | | |
|---|---|---|
| DE | 1996 4325 B4 | 8/2000 |
| DE | 10 2004 022 557 A1 | 12/2005 |
| DE | 10 122 425 B4 | 6/2006 |
| DE | 10 2010 040 399 A1 | 3/2012 |
| RU | 2028463 C1 | 2/1995 |

* cited by examiner

COOLING JACKET

CROSS-REFERENCES TO RELATED APPLICATIONS

This application is the U.S. National Stage of International Application No. PCT/EP2013/062881, filed on Jun. 20, 2013, which designated the United States and has been published as International Publication No. WO 2014/016064 and which claims the priority of German Patent Application, Serial No. 10 2012 213 059.4, filed on Jul. 25, 2012, pursuant to 35 U.S.C. 119(a)-(d).

BACKGROUND OF THE INVENTION

The invention relates to a cooling jacket for cooling by means of a fluid, a component, in particular a machine, that comprises a cooling jacket and a vehicle that comprises a component, in particular a machine. The invention also relates to a method for producing a cooling jacket and a method for producing a component, in particular a machine.

Cooling jackets are used for cooling components, in particular machines, to enhance their performance. The cooling jacket surrounds the part of the component, in particular the machine, that heats up during the operation of the component, in particular the machine. The heat is removed from the component, in particular the machine, by a fluid flowing in the cooling jacket.

A component, in particular a machine, is an object, which has a function in a technical complex, for example in a vehicle or a system. When the component, in particular the machine, performs the function, this results in heating of the component, in particular the machine. The more compact the design of the component, in particular the machine, and the more powerful the performance of the component, in particular the performance of the machine, the more powerful the heating. The heat can be removed from the component, in particular the machine, by a cooling jacket.

The intensive automation of the world, which in particular has also pervaded the mobile world, means that a component, in particular a machine, can be used in very different technical complexes.

SUMMARY OF THE INVENTION

The invention is therefore based on the object of improving the use of a cooling jacket in different technical complexes.

According to one aspect of the invention, the object is achieved by a cooling jacket for cooling by means of a fluid, which cooling jacket includes
an inner part,
an outer jacket that extends in an axial direction, wherein the outer jacket surrounds the inner part in a cross-sectional plane perpendicular to the axial direction,
a duct for holding the fluid, wherein a first boundary of the duct comprises an outer surface of the inner part and a second boundary of the duct comprises an inner surface of the outer jacket,
wherein the inner part is arranged in the outer jacket, wherein a material property of the outer jacket is different from the material property of the inner part.

According to another aspect of the invention, the object is also achieved by a component, in particular a machine, including a cooling jacket as set forth above.

According to another aspect of the invention, the object is also achieved by a vehicle including a component as set forth above.

According to another aspect of the invention, the object is also achieved by a method for producing a cooling jacket, wherein the inner part is arranged in the outer jacket.

The object is also achieved by a method for producing a component, in particular a machine.

With the method as claimed in the invention for producing a component, in particular a machine, a cooling jacket as claimed in the invention is provided.

The cooling jacket as claimed in the invention achieves the object in that the inner part and the outer jacket are two separate parts and a material property of the outer jacket is different from the material property of the inner part. Thus, the outer jacket can advantageously be produced independently of the inner part. The outer jacket can be produced individually for a specific structure in a specific application with an individual material property.

The inner part can be used for all structures and all applications.

The material property of the outer jacket is different from the material property of the inner part so that the outer jacket can interact in a different way with its environment than the inner part.

The material property of the outer jacket can facilitate an advantageous interaction between the outer jacket and a technical complex using the cooling jacket.

The material property of the inner part can enable an advantageous interaction between the inner jacket and a component, in particular a machine that at least partially surrounds the cooling jacket.

It has also been recognized that a thickness of the cooling jacket in one radial direction, in particular in all radial directions, of the cross-sectional plane can be reduced by dividing the cooling jacket into an outer jacket and an inner part with the same cooling performance.

The inner part can be a jacket. Thus, the inner part can absorb heat in virtually all radial directions in a cross-sectional plane perpendicular to the axial direction and emit it to the fluid in the duct.

The inner part can surround a cross-sectional plane perpendicular to the axial direction. This has the advantage that a chamber surrounding the inner part perpendicular to the axial direction is better protected. In particular, this can be achieved in that the inner part is made of a metallic material.

The outer jacket can extend along the inner part in the axial direction from one axial end of the inner part to the other axial end of the inner part. This has the advantage that the inner part is better protected against interaction with the technical complex. In particular, this can be achieved in that that the outer jacket is made of a metallic material.

In addition to the advantages named above, a component as claimed in the invention, in particular a machine as claimed in the invention, also has the further advantage that, independently of its usage in different technical complexes, it can be surrounded by an unchanged inner part. Thus, the component can be used more efficiently independently of the different interactions in different technical complexes.

With a machine as claimed in the invention, the material property of the outer jacket can advantageously be embodied such that the machine transmits the greatest possible amount of kinetic energy into a technical complex structure more efficiently or a large amount of kinetic energy is transmitted more efficiently from a technical complex structure into the machine.

In particular an electric machine as claimed in the invention can advantageously be more compact. With an electric machine, the largest possible chamber is used for a magnetic circuit in order to achieve a high power density of the electric machine. In order to achieve the smallest possible dimensions of the electric machine, the dimensions of the magnetic circuit are designed as small as possible. Here, it is accepted that the magnetic circuit heats up. The magnetic circuit of the electric machine comprises a stator, a rotor and a winding in order to convert electric energy into kinetic energy or kinetic energy into electric energy. To ensure that the power of the electric machine is not reduced by increasing heating or the electric machine is not damaged, the heat has to be emitted from the electric machine. The heat can be emitted via a cooling jacket as claimed in the invention, wherein the inner part of the cooling jacket can be embodied independently of the outer jacket for heat transfer from the magnetic circuit into the duct of the cooling jacket.

With an electric machine as claimed in the invention, the inner part can have a thin design and the electric machine as claimed in the invention can be nevertheless protected against the ingress of the fluid into the electric machine through the inner part. Thus, with a thin inner part, current-carrying parts, in particular the winding, can be protected against the fluid. Small amounts of the fluid can impair the operation of the electric machine or result in its destruction.

In addition to the advantages named above, a vehicle as claimed in the invention also has the further advantage that independently of the inner part, the outer jacket can have a weather-resistant design.

In addition to the advantages named above, a method as claimed in the invention for producing a cooling jacket as claimed in the invention also has the further advantage that, before the arrangement of the inner part in the outer jacket, the inner part and/or the outer jacket can advantageously be machined in an improved simple manner. Thus, the inner surface of the outer jacket is easy to machine. The outer surface of the inner part is easy to machine.

In addition to the advantages named above, a method as claimed in the invention for producing a component as claimed in the invention, in particular a machine as claimed in the invention, also has the further advantage that the cooling jacket can be provided with a shorter delivery time since the inner part is produced in larger quantities and the outer jacket requires a shorter production time.

Advantageous embodiments of the invention are disclosed in the dependent claims.

Thus, in one advantageous embodiment of a cooling jacket as claimed in the invention, it is advantageous that the inner part is produced by a first method and the outer jacket is produced by a second method, wherein at least partially the second method determines the material property of the outer jacket. This has the advantage that the nature and performance of the second method enables the material property of the outer part to be least partially different from the material property of the inner part.

The second method can be a casting method. A casting method offers high degrees of freedom in the design of the outer jacket.

The casting method enables the outer surface of the outer jacket to be weather-resistant. Thus, the cooling jacket can also be used as a housing with a component, in particular an machine of a vehicle. The outer surface of the outer jacket can thus, for example, be weather-resistant in that locally restricted overhangs prevent the accumulation of spray water in recesses of the outer jacket or at projections of the outer jacket. Spray water can reduce the lifetime of a vehicle, since, for example with the appropriate road conditions, the spray water can contain deicing salt. Fixing means of the outer jacket can comprise recesses of the outer jacket or projections of the outer jacket.

As a result of the casting method, the outer jacket can comprise pores or cavities. The casting methods are subject to continuous further development so that the number and/or size of the cavities or pores can be reduced. On the other hand, in the case of an outer jacket produced by a casting method, the pores reduce the weight of the outer jacket.

The casting method can be a diecasting method. A diecasting method can achieve a high dimensional stability with high degrees of freedom in the specification of the geometry. Thus, fixing means can be provided for different fixing possibilities. The diecasting method enables smooth surfaces and edges. Thus, harmful materials from the environment are less able to adhere to the fixing means and gradually destroy the fixing means.

In a further advantageous embodiment of a cooling jacket as claimed in the invention, the inner part is produced by a first method and the outer jacket is produced by a second method, wherein the material property of the inner part is at least partially determined by the first method. This has the advantage that the nature and performance of the first method enables the material property of the inner part at to be least partially different from the material property of the outer jacket.

The first method can be a pressing method. During production by means of the pressing method, the inner part is compacted. The result of this is that the inner part has high stability even with a low wall thickness. With a lower wall thickness, a larger amount of heat can be transmitted out of the chamber in the cooling jacket through the inner part onto the fluid in the duct in a time unit.

The compaction of the pressing method also achieves better heat transmission between the chamber in the cooling jacket and the fluid in the duct of the cooling jacket.

The pressing method can be an extrusion method. An extrusion method enables economic production of the inner part with a low thickness.

In a further advantageous embodiment of a cooling jacket as claimed in the invention, the outer jacket comprises a fixing means. Thus, the inner part can advantageously be produced independently of the nature of the fixing of the cooling jacket in a technical complex. The outer jacket can be produced individually for a specific structure in a specific application with a fixing means at a necessary fixing location with a suitable fixing means, in particular with a specific design.

The outer jacket can comprise a locally restricted fixing means at a locally restricted fixing location in the axial direction. The locally restricted fixing means has a higher strength than a location of the outer jacket outside the locally restricted fixing location in order to enable secure fixing. This can, for example, be achieved in that the outer jacket has a greater thickness at the locally restricted fixing location in the radial direction than at other locations in the axial direction. The fixing means that is locally restricted in the axial direction achieves a reduction of the weight of the cooling jacket.

The outer jacket can comprise a locally restricted fixing means at a locally restricted fixing location on the outer surface in the circumferential direction of the outer jacket. In particular, a locally restricted fixing means, which is locally restricted in the axial direction of the outer jacket and locally restricted in the circumferential direction of the outer jacket, can additionally achieve a greater reduction in the weight of the cooling jacket.

The fixing means can be integrally connected to the outer jacket. This has the advantage that the fixing means and the outer jacket can be produced from one material.

The fixing means can be held in the outer jacket. This has the advantage that, during the production of the outer jacket, the fixing means can be fixed as a finished part to the outer jacket in a time-saving manner. If, for example, the outer jacket for example is produced using a casting method, the finished part can be cast into the outer jacket in a time-saving manner.

The outer jacket can surround a cross-sectional plane perpendicular to the axial direction. This advantageously enables the fixing means to be provided in any radial direction on the outer jacket.

The inner part can surround a cross-sectional plane perpendicular to the axial direction. This has the advantage that a chamber surrounding the inner part perpendicular to the axial direction is protected against the fixing means. Thus, when the fixing means is arranged on a fixing location with a specific design only little consideration needs to be paid to the chamber.

A component, in particular a machine, has the advantage that it can be fixed in different structures and applications on a suitable fixing location with a suitable fixing means, in particular a specific design, on the cooling jacket. Thus, the component can be used independently of the structure and the application. Any adaptation of the fixing means to a specific structure and a specific application that may be necessary is provided by the outer jacket.

With a machine, the fixing means can advantageously be arranged on the outer jacket such that the greatest possible amount of kinetic energy is transmitted more effectively by the machine into a structure of a technical complex or a large amount of kinetic energy is transmitted more effectively by the structure of a technical complex into the machine.

A machine can be mounted by the fixing means on the outer jacket with a low degree of vibration in a structure of a technical complex. To this end, the outer jacket can comprise one or more further fixing means at one fixing location or several fixing locations.

In a further advantageous embodiment of a cooling jacket as claimed in the invention, the material property is a thermal conductivity of a material, wherein the outer jacket comprises a first material and the inner part a second material with lower thermal conductivity than the first material. This achieves better heat transmission between the chamber in the cooling jacket and the fluid in the duct of the cooling jacket.

The thermal conductivity of a material can inter alia also be dependent on the porosity of the material, i.e. on the number and size of pores or cavities.

The outer jacket can comprise a first material and the inner part a second material so that the fluid can emit less heat through the outer jacket in a time unit than the fluid can absorb through the inner part. Hence, the outer jacket radiates less heat. The heat can be transported away by the fluid and used in a cooling circuit to heat up other components or chambers. The cooling jacket as claimed in the invention can be arranged in a technical complex at a location where it is exposed to weathering without having to dispense with the use of waste heat for heating objects or chambers. In the case of a vehicle, the waste heat can be used adjust the temperature of the battery.

In a further advantageous embodiment of a cooling jacket as claimed in the invention, the inner part comprises a web in the axial direction. The first boundary of the duct comprises a surface of the web. This has the advantage that the web forms a plurality of ducts for holding the fluid in a simple manner. Since the inner part comprises the web, the outer jacket can be produced individually for a specific structure in a specific application with an individual material property without having to pay consideration to the position of the web. Thus, it is, for example, for different fixing possibilities to be provided by the outer jacket without this making it impossible for a web to be located at a specific point of the cooling jacket.

The axial web can be embodied in one part with the inner part in order to save time when producing the inner part.

The webs can be produced by a pressing method. This has the advantage that, due to their axial direction, the webs can be produced in a time-saving manner with the pressing method.

It is also advantageous that, in particular when the webs are produced with a pressing method, the webs can be matched to one another with respect to their height by cutting operation, for example by turning, and the height of the webs can be reduced virtually as desired. Thus, a low thickness of the cooling jacket can be achieved such that a component as claimed in the invention, in particular a machine as claimed in the invention, can have a high power density.

DESCRIPTION OF THE DRAWING

The above-described properties, features and advantages of this invention and the manner in which they are achieved will become clearer and more plainly comprehensible in conjunction with the description of the exemplary embodiments which are illustrated and explained in more detail in conjunction with the drawings, which show.

DETAILED DESCRIPTION OF PREFERRED EMBODIMENTS

Figure 1:
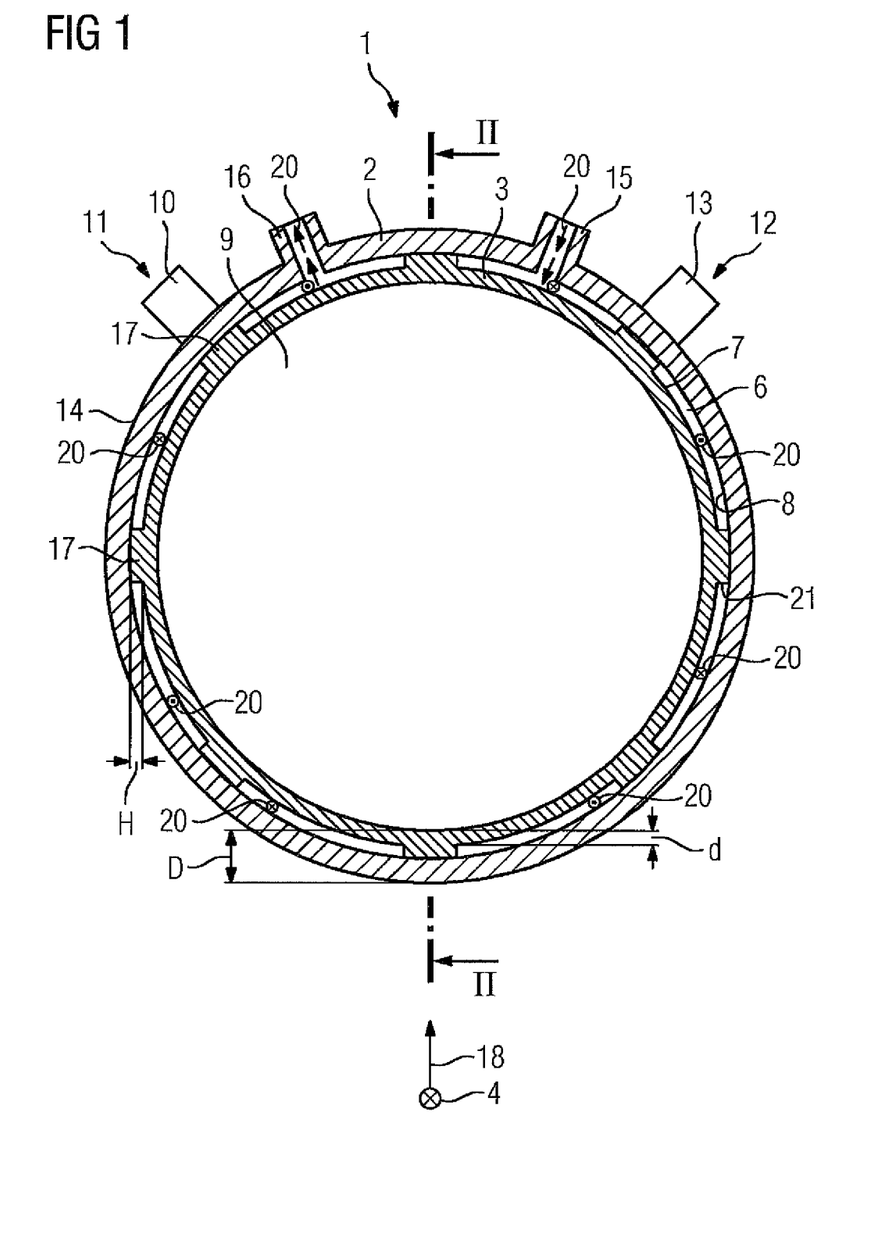
FIG. 1 a first exemplary embodiment of a cooling jacket,
FIG. 2 a cross section along the line II-II in FIG. 1,
FIG. 3 an exemplary embodiment of an outer jacket,
FIG. 4 an exemplary embodiment of an inner part,
FIG. 5 an exemplary embodiment of a vehicle,
FIG. 6 an exemplary embodiment of an electric machine.

FIG. 1 shows an exemplary embodiment of a cooling jacket 1 comprising an inner part 3 and an outer jacket 2 that extends in an axial direction 4, wherein the outer jacket 2 surrounds the inner part 3 in a cross-sectional plane, as shown in FIG. 1, perpendicular to the axial direction 4. The cooling jacket 1 has a thickness D. The cooling jacket 1 comprises a duct 6 for cooling by means of a fluid 20, wherein a first boundary of the duct 6 comprises an outer surface 7 of the inner part 3 and a second boundary of the duct 6 comprises the inner surface 8 of the outer jacket 2. The inner part 3 is arranged in the outer jacket 2, wherein the outer jacket 2 comprises a fixing means 10. In the cooling jacket 1, fluid 20 is used for cooling, wherein in the figures, the fluid 20 is represented by an arrow indicating a direction of flow of the fluid 20. The fluid 20 can flow into the duct 6 via the inflow 15 in the outer jacket 2. The fluid 20 is also guided by a web 17 in a meandering fashion to an outflow 16 in the outer jacket 2. The fluid 20 can flow out via the outflow 16 of the cooling jacket 1. The fluid 20 used is a coolant consisting of water and Glysantin G30® in the ratio 50:50.

The inner part 3 surrounds a chamber 9 perpendicular to an axial direction 4. The first boundary of the duct 6 comprises a surface 21 of a web 17. At the first boundary of the duct 6, the inner part 4 has a low thickness d. A height H of the web 17 enables a low thickness D of the cooling jacket 1. The outer jacket 2 comprises a further fixing means 13 at a further fixing location 12 so that the cooling jacket 1 has a plurality of fixing locations. The outer jacket 2 comprises the fixing means 10 and the further fixing means 13 at different radial directions.

Figure 2:
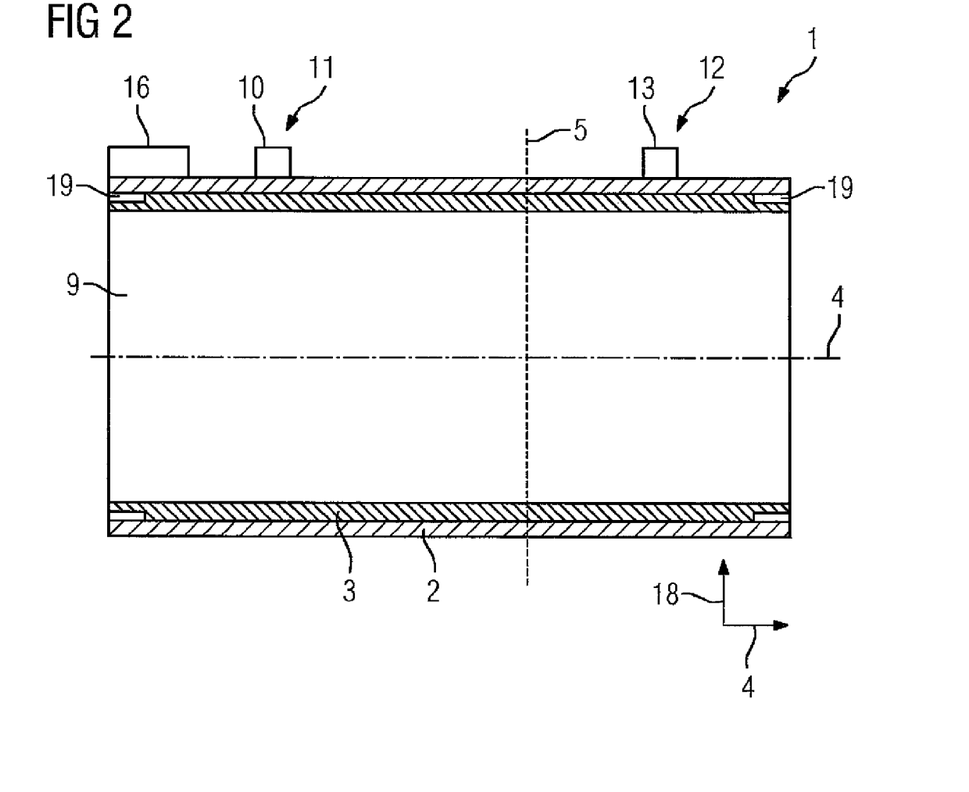

FIG. 2 shows a cross section along the line II-II in FIG. 1. The outer jacket 2, which extends in the axial direction 4, surrounds the inner part 3 in a cross-sectional plane 5 perpendicular to the axial direction 4. FIG. 2 shows that the outer jacket 2 comprises the further fixing means 13 at the further fixing location 12, which extends in the axial direction 4 at the locally restricted further fixing location 12.

Figure 3:
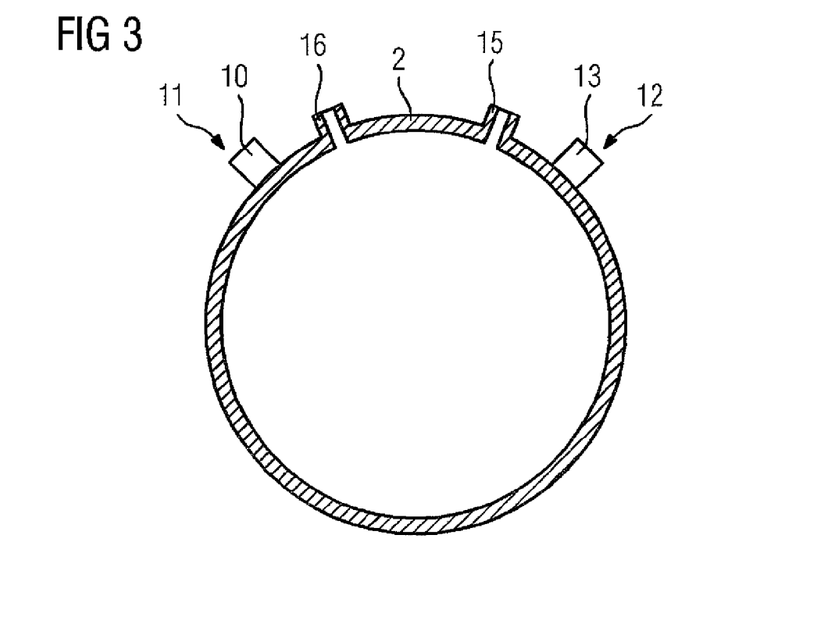

FIG. 3 shows the outer jacket 2 before the inner part 3 is arranged in the outer jacket 2. The outer jacket 2 is produced by a diecasting method and comprises the material AlSi9Cu3.

Figure 4:
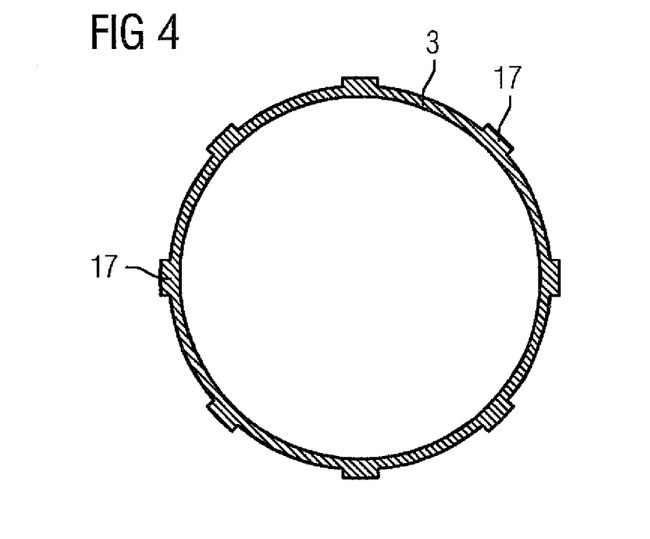

FIG. 4 shows the inner part 3 before arrangement in the outer jacket 2. The inner part 3 is produced by an extrusion method and comprises the material AlMgSi 0.5 F22.

Figure 6:
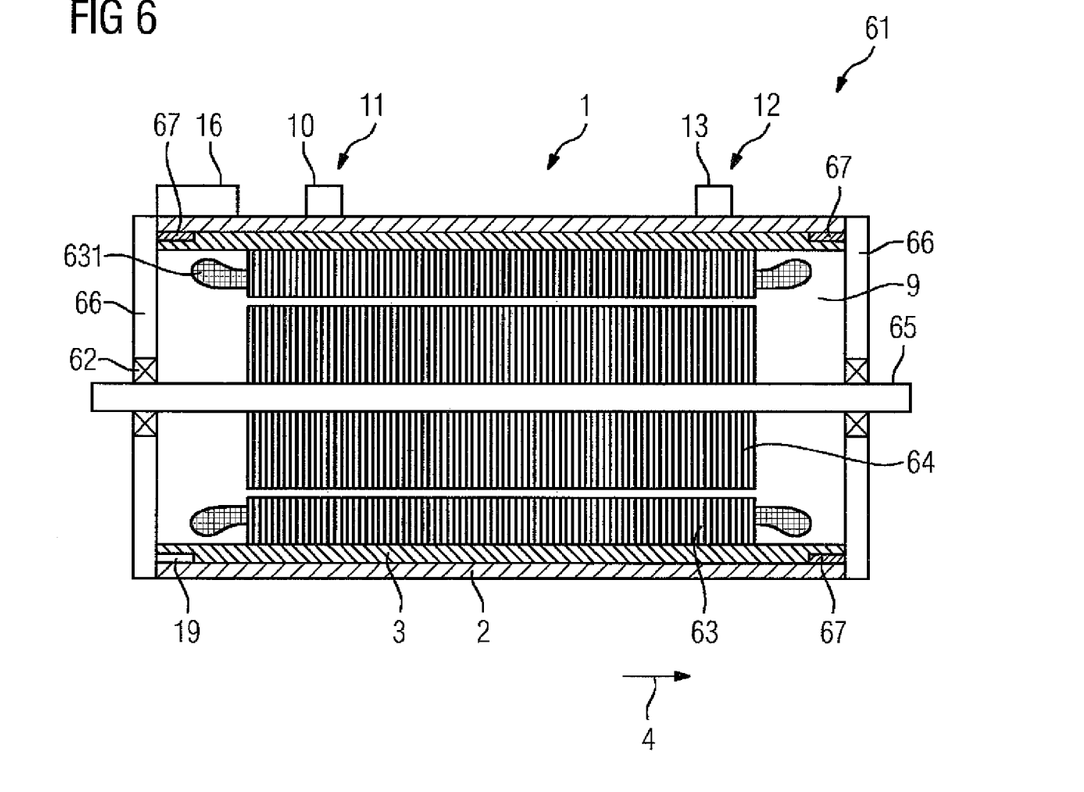

FIG. 6 shows an exemplary embodiment of an electric machine 61, which comprises a stator 63 and a rotor 64. A housing of the electric machine 61 comprises a cooling jacket 1 and end shields 66. The rotor 64 comprises a shaft 65 and is mounted rotatably in the end shields 66 by means of bearings 62. The cooling jacket 1 comprises the outer jacket 2, the inner part 3 and plugs 67. The plugs 67 close openings 19 so that a meander-shaped guidance of the fluid 20 is achieved.

A magnetic circuit of the electric machine 61 comprises the stator 63, the rotor 64 and the winding 631. The magnetic circuit enables the electric machine to convert electric energy into kinetic energy or kinetic energy into electric energy.

Figure 5:
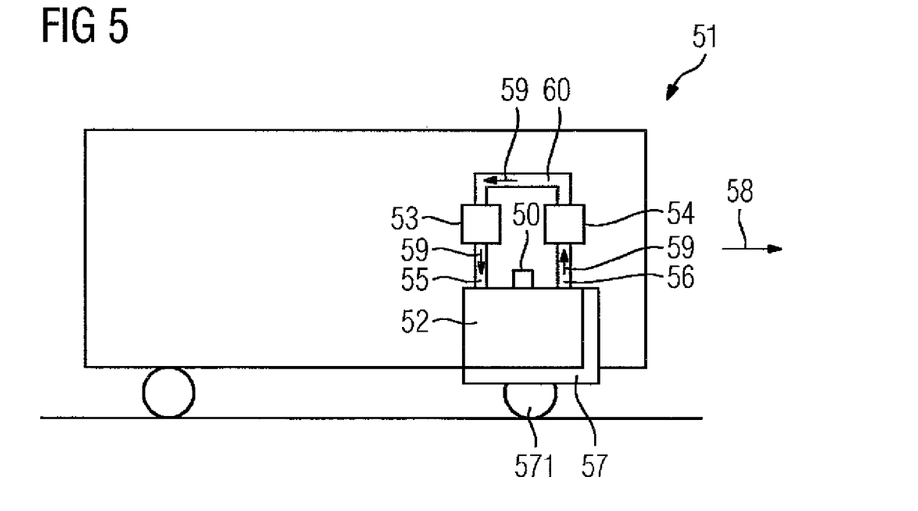

FIG. 5 shows an exemplary embodiment of a vehicle 51. The vehicle 51 comprises a drive 57, which comprises an electric machine as claimed in the invention 52. The drive 57 is coupled to a wheel 571 of the vehicle 51 and generates kinetic energy, which is able to move the vehicle 51 in a direction of movement 58. The electric machine as claimed in the invention 52 comprises a fixing means 50 at a locally restricted fixing location. The vehicle 51 comprises a cooling circuit 60 as claimed in the invention comprising the electric machine 52, a pump 54, a fluid 59 and an electric battery 53. The fluid 59 comprises water and Glysantin G30® in the ratio 50:50. The fluid 59, for cooling the electric machine 52 as claimed in the invention, flows in the cooling circuit 60 moved by a pump 54 out of an outflow 56 of the electric machine 52 to the battery 53 in order to heat it to a temperature that enables optimal use of the battery. From the battery 53, the fluid 59 flows via an inflow 52 into the electric machine as claimed in the invention 52.

Although the invention was described in more detail by the preferred exemplary embodiments, it is not restricted to the disclosed examples. Other variants can be derived herefrom the person skilled in the art without departing from the scope of protection of the invention.

The invention claimed is:

1. A cooling jacket for cooling using a fluid, comprising:
    an inner part made of an aluminum-magnesium-silicium alloy and produced by an extrusion method as a first method such as to at least partially provide the inner part with a desired material property and with a web which extends in an axial direction and is formed in one piece with the inner part;
    an outer jacket made of an aluminum-silicium-copper alloy extending in the axial direction and disposed in surrounding relationship to the inner part in a cross-sectional plane perpendicular to the axial direction, said outer jacket being produced by a second method and having a material property which is different than the material property of the inner part; and
    a duct for holding the fluid, said duct having a first boundary, which is formed by an outer surface of the inner part and includes a surface of the web, and a second boundary, which is formed by an inner surface of the outer jacket.

2. The cooling jacket of claim 1, wherein the material property of the outer jacket is at least partially formed by a second casting method, which is different from the first extrusion method.

3. The cooling jacket of claim 1, wherein the outer jacket comprises a fixing member.

4. The cooling jacket of claim 1, wherein the material property is a thermal conductivity of a material, wherein the outer jacket comprises a first material of a thermal conductivity which is greater than a thermal conductivity of the metallic material of the inner part.

5. The cooling jacket of claim 1, wherein the outer jacket comprises a first material selected such that the fluid emits less heat through the outer jacket in a time unit than the fluid is able to absorb through the inner part.

6. The cooling jacket of claim 1, wherein the inner part has a plurality of said web of matching height using a cutting process.

7. The cooling jacket of claim 6, wherein the extrusion method to produce the inner part reduces a height of the webs.

8. A component, comprising a cooling jacket which includes an inner part made of an aluminum-magnesium-silicium alloy and produced by an extrusion method as a first method such as to at least partially provide the inner part with a desired material property and with a web which extends in an axial direction and is formed in one piece with the inner part, an outer jacket made of an aluminum-silicium-copper alloy extending in the axial direction and disposed in surrounding relationship to the inner part in a cross-sectional plane perpendicular to the axial direction, said outer jacket being produced by a second method and having a material property which is different than the material property of the inner part, and a duct for holding the fluid, said duct having a first boundary, which is formed by an outer surface of the inner part and includes a surface of the web, and a second boundary, which is formed by an inner surface of the outer jacket.

9. The component of claim 8, constructed in the form of a machine.

10. The component of claim 8, wherein the material property of the outer jacket is at least partially formed by a second casting method, which is different from the first extrusion method.

11. The component of claim 8, wherein the outer jacket comprises a fixing member.

12. The component of claim 8, wherein the material property is a thermal conductivity of a material, wherein the outer jacket comprises a first material of a thermal conductivity which is greater than a thermal conductivity of the metallic material of the inner part.

13. The component of claim 8, wherein the outer jacket comprises a first material selected such that the fluid emits less heat through the outer jacket in a time unit than the fluid is able to absorb through the inner part.

14. The component of claim 8, wherein the inner part has a plurality of said web of matching height using a cutting process.

15. A vehicle, comprising a component which includes a cooling jacket which comprises an inner part made of an aluminum-magnesium-silicium alloy and produced by an extrusion method as a first method such as to at least partially provide the inner part with a desired material property and with a web which extends in an axial direction and is formed in one piece with the inner part, an outer jacket made of an aluminum-silicium-copper alloy extending in the axial direction and disposed in surrounding relationship to the inner part in a cross-sectional plane perpendicular to the axial direction, said outer jacket being produced by a second method and having a material property which is different than the material property of the inner part, and a duct for holding the fluid, said duct having a first boundary, which is formed by an outer surface of the inner part and includes a surface of the web, and a second boundary, which is formed by an inner surface of the outer jacket.

16. A method for producing a cooling jacket, comprising:
extruding as a first method an inner part from a metallic material such as to at least partially provide the inner part with a desired material property and with a web which extends in an axial direction and is formed in one piece with the inner part;
producing by a second method an outer jacket of a material having a material property which is different from the material property of the inner part; and
placing the outer jacket in surrounding relationship to the inner part in a cross-sectional plane perpendicular to the axial direction such that an outer surface of the inner part forms a first boundary of a duct for holding the fluid and includes a surface of the web, and an inner surface of the outer jacket forms a second boundary of the duct.

17. A method for producing an electric machine, comprising:
extruding as a first method an inner part from a metallic material such as to at least partially provide the inner part with a desired material property and with a web which extends in an axial direction and is formed in one piece with the inner part;
producing by a second method an outer jacket of a material having a material property which is different from the material property of the inner part;
placing the outer jacket in surrounding relationship to the inner part in a cross-sectional plane perpendicular to the axial direction to produce a cooling jacket such that an outer surface of the inner part forms a first boundary of a duct for holding the fluid and includes a surface of the web, and an inner surface of the outer jacket forms a second boundary of the duct;
disposing a rotor at a distance within a stator;
placing the cooling jacket in surrounding relationship to the stator; and
mounting a rotor shaft of the rotor in end shields attached to the cooling jacket at axial ends of the cooling jacket.

* * * * *